Figure 1:
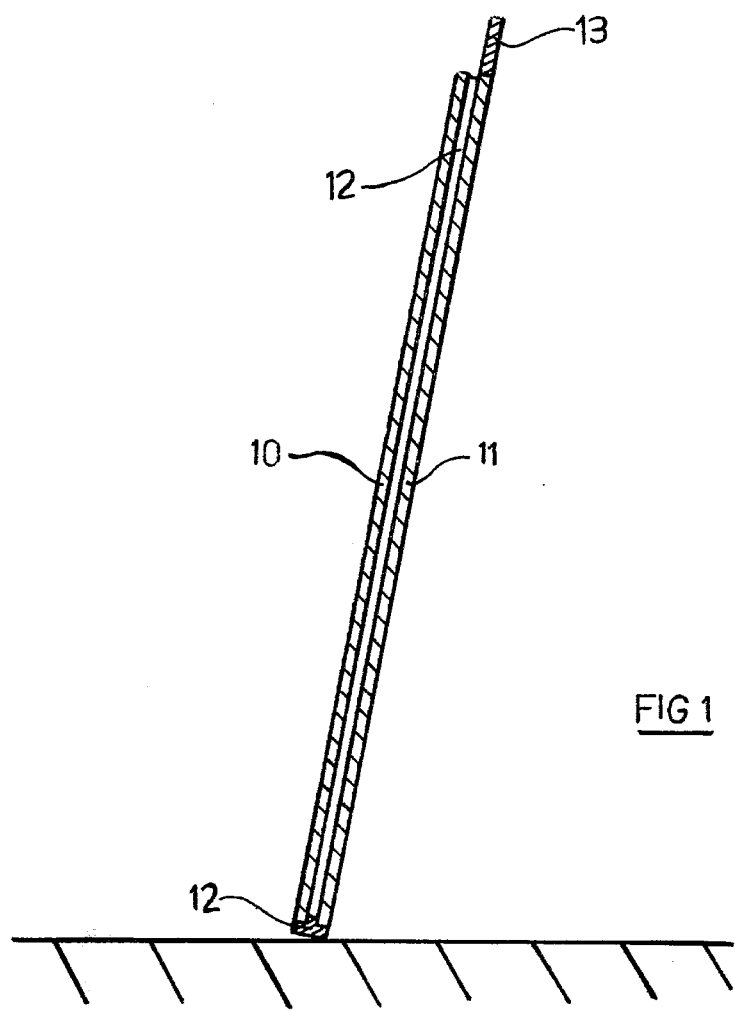

United States Patent [19]

Langlands

[11] 4,234,533
[45] Nov. 18, 1980

[54] METHOD OF BONDING SPACED SHEETS BY MOLDING RESIN THEREBETWEEN

[75] Inventor: James W. Langlands, Glasgow, Great Britain

[73] Assignee: Mary Frances Theresa Langlands, Glasgow, Great Britain

[21] Appl. No.: 30,427

[22] Filed: Apr. 16, 1979

Related U.S. Application Data

[63] Continuation-in-part of Ser. No. 895,637, Apr. 12, 1978, abandoned.

[30] Foreign Application Priority Data

Oct. 31, 1978 [NZ] New Zealand ............... 188781

[51] Int. Cl.² ........................... B32B 31/06
[52] U.S. Cl. .................. 264/261; 156/107; 264/1; 264/316; 425/812
[58] Field of Search ............... 264/261, 102, 1, 808, 264/316; 425/DIG. 812; 156/99, 104, 107, 244.22

[56] References Cited

U.S. PATENT DOCUMENTS

| | | | |
|---|---|---|---|
| 3,315,035 | 4/1967 | Applegath et al. | 428/415 |
| 3,334,008 | 8/1967 | Park et al. | 156/99 |
| 3,431,331 | 3/1969 | Pincus et al. | 425/812 |
| 3,478,135 | 11/1969 | Randall | 425/812 |
| 3,509,015 | 4/1970 | Wismer et al. | 156/99 |
| 4,125,669 | 11/1978 | Triebel et al. | 156/99 |

Primary Examiner—Michael W. Ball
Attorney, Agent, or Firm—Frailey & Ratner

[57] ABSTRACT

A method of producing a bonded laminate by sealing round the edges of a pair of face-to-face spaced sheets of frangible material, introducing into the envelope so formed a liquid resin composition and solidifying the liquid, the seal around the sheets being formed by gas-permeable, resin-impermeable material so that when the resin is introduced the sheets can be sealed completely and trapped air can escape through the seal. This permits very precise control of the amount of resin in the laminate and avoids difficulties involved in the removal of air bubbles.

10 Claims, 1 Drawing Figure

METHOD OF BONDING SPACED SHEETS BY MOLDING RESIN THEREBETWEEN

This application is a continuation-in-part of Ser. No. 895,637 filed on Apr. 12, 1978, now abandoned.

This invention relates to a method of producing a laminate.

Laminates provide a way of strengthening frangible material, for example glass, so as to extend its uses and to render it safer to use in certain circumstances. Thus laminated glass products can be used for car windscreens, glass doors, balustrades, bulletproofing and many other uses where the glass product must be strong and/or shatterproof.

In conventional laminated glass products a sheet of glass is bonded to a layer of polymer, and a further sheet or layer of material is bonded to the other side of the polymer layer, so that the polymer is "sandwiched" between two outer layers. If the glass sheet is then struck a blow it cracks or breaks, but does not shatter into small sharp pieces as the broken pieces are still bonded to and held in place by the polymer layer. If the laminated glass is used in a car windscreen, therefore, occupants of the car are not showered with broken glass on breakage of the windscreen.

Some previously-proposed methods of producing laminates suffer from the disadvantage that they require considerable capital expenditure to set up the necessary apparatus. One particular method involves the various stages of providing a pre-formed sheet of vinyl polymer, placing the vinyl sheet between planar faces of two sheets of glass, passing the resulting "sandwich" through a mangle to compress the vinyl sheet against the glass sheets, and bonding the vinyl sheet to the glass sheets by heating in an oven and then cooling. This method uses costly equipment and is inefficient as it involves a series of operations with transport of the composite from one apparatus to another.

The disadvantages inherent in this previously-proposed method have been dealt with in U.S. Pat. Nos. 3,334,008 (Park et al) and 3,509,015 (Wismer et al) in which a method is described for producing laminated glass by sealing the periphery of two parallel glass sheets with pressure-sensitive tape and forcing resinous material under pressure into the inter-sheet space. The resinous material is forced through a self-closing valve held in place with the tape while trapped air escapes through an aperture in the taped seam at the top of the cell.

U.S. Pat. No. 4,125,669 (Triebel et al.) describes a similar method in which two glass panes are sealed all round except for a filling opening and an aeration opening, and introducing a binder material into the envelope thus formed in an amount calculated to exactly fill the envelope. Putty is applied to the openings just before emergence of the binder on laying the filled envelope flat.

U.S. Pat. No. 3,315,035 (Appelgath et al.) described a method involving maintaining the glass sheets in opposite relationship, heating the sheets to about 200° F. and injecting a resin composition containing a hardening agent, preheated to about 200° F., into the inter-sheet space and curing the assembled article.

While these above methods overcome the disadvantage of high equipment costs and transfer of the laminate from one apparatus to another, nevertheless they themselves have various drawbacks which the present invention seeks to overcome. In particular, a very considerable problems exists in producing a laminate which can be made to an exact finished size and whose interlayer is free from air bubbles, as in practice the methods of the above-identified patents involve the operator in very precise and difficult estimation of the point at which the envelope formed between the sheets is completely filled with the interlayer liquid without overflowing, and at which all the air bubbles have been eliminated.

In the above-described methods one or two openings are provided in the envelope for filling and air bubble removal, but in each case removal of bubbles must be certain and filling achieved precisely before the openings are sealed. Slight overfilling results in loss of resin and an inferior product, while slight underfilling results in air being trapped in the envelope. Thus measurement of the amount of resin required before its introduction is only effective if the envelope is fully sealed at the crucial moment when the resin exactly fills the envelope and after complete removal of air bubbles.

The air bubble removal is difficult with these previously-proposed methods as the opening must be sufficiently small to allow accurate estimation of the point at which the envelope is just filled, but this necessarily restricts the effectiveness of bubble removal as bubbles must be directed to this small opening or become trapped at the envelope periphery; direction of the bubbles in this manner can be time-consuming and difficult.

According to the present invention there is provided a method of producing a laminate comprising placing a pair of sheets of frangible material in face-to-face relationship, introducing between the sheets a liquid which on solidifying forms a polymer of greater resistance to fracture than the sheets and adheres to the sheets, forming around the periphery of the sheets a continuous barrier to passage of the liquid thereby to retain the liquid between the sheets, wherein at least part of the barrier is gas-permeable, expelling air from the inter-sheet space through the barrier so as to cause the liquid to fill the intersheet space, and solidifying the liquid to form a bonded laminate.

By providing a gas-permeable seal for forming the envelope the drawbacks of the prior art are overcome, as the method of this invention requires no expensive equipment, and makes it no longer necessary to judge when the liquid exactly fills the envelope and contains no air bubbles. After the liquid is introduced the envelope can be completely sealed immediately, and trapped air escapes through the gas-permeable seal, which can if desired extend all round the sheets, until the space within the envelope is filled entirely with the liquid. As the seal is gas-permeable and not liquid-permeable the liquid is retained within the envelope, and a measured amount of liquid can be guaranteed to produce a precise desired thickness of interlayer for the laminates without any likelihood of human error after its introduction.

Gas-permeable materials which are suitable for the purpose of this invention are known, and preferably the material used adheres to the sheets. In this respect the material may be a fine-pored strip having pressure-sensitive adhesive faces, and a particularly suitable material is "Scotchmount" which is marketed by 3M.

The seal may be gas permeable over any portion or the whole of the sheets periphery, but the greater the extent of the permeability the easier it is for air to escape without directing it to any particular outlet portion of the seal. Thus, if the liquid is introduced into the envelope with the sheets inclined to the horizontal, for example by pouring under gravity, the sheets can be immediately laid flat to provide even thickness of the interlayer, allowing the trapped air to escape around the periphery by passage through the gas-permeable material.

The sheets of frangible material can be of any material which it is desired to strengthen by means of lamination with a polymer; they may be, for example, glass, polymethyl methacrylate or polycarbonate, although other materials which can bond with the polymer may also be used. The method of the invention is of considerable benefit when the material is glass because of the wide range of uses for laminated glass.

When the frangible material is translucent, as for example glass, and the polymer formed by solidifying the liquid is also translucent, it is often of advantage for the two materials to be selected as having similar refractive indices. This is particularly effective when the sheet of frangible material has one non-planar surface, for example in the case of one or both sheets being of a patterned glass, and it is desired to produce a laminate which does not distort light passing through it, as the liquid can be applied to a depth sufficient to cover completely the non-planar surface. If the liquid layer is then solidified the similar refractive indices of the sheet and the polymer will cause the overall optical properties of the laminate to be similar to those of a sheet having parallel planar surfaces. An advantage of this is that if a planar sheet of suitable size is not available for a translucent laminate a non-planar sheet can be used instead in combination with a translucent polymer of similar refractive index.

The polymer produced on solidification can be any having the desired properties for the laminate provided that it can be made to adhere to the sheet of frangible material used and it has greater resistance to fracture than the sheet. For ease of manufacture it should be a polymer which does not shrink on curing. Curing may be effected with the aid of for example heat, UV light or of a catalyst. Polymers which have been found to be suitable in various situations are polyesters, vinyl polymers and epoxy resins. The thickness of the polymer layer can be selected as desired, but from 0.4 to 3 mm has been found to be effective in many cases; thicker layers can be used for soundproofing purposes.

A polymer which has been found to be especially effective in the present method is manufactured by Warwick Chemical Limited under the trade name UVAC 2721. This is a resin made from glycols, polyols, dibasic acids and polyfunctional acids and having a very small degree of shrinkage on curing. The resin is prepared by mixing the ingredients in a resin kettle, polymerized to a closely controlled molecular weight which is in the highly viscous liquid stage after cooling. The mixture is thinned down to pourable liquid by the addition of monomers such as styrene, methylmethacrylate, vinyl toluene and other acrylates. Cure is begun by adding an initiator, usually an organic hydroperoxide such as methyl ethyl ketone peroxide. Typically, promoters and accelerators are added (UVAC 2721 contains cobalt naph.) to promote the decomposition of the initiator at room temperature and, thus, rapid low temperature curing. Cure takes place in two stages: the initial formation of soft gel is followed by polymerisation to give a transparent tough product not unlike natural rubber.

The most important properties of the UVAC 2721 system include ease of handling, low temperature curing with no volatile involved, light colours and generally good mechanical and physical properties.

A primer can be employed to improve the bond. The primer may be in the form of an adhesion promoter or coupling agent, for example a silicon-based compound such as $\gamma$-methacryloxypropyltrimethoxysilane or a compound sold by Bondaglass-Voss Limited under the trade name "G4." The primer can either be applied directly to the sheet before application of the liquid or applied to the sheet in admixture with the liquid.

Particularly when the polymer is a polyester it has been found that adhesion is best achieved to an inorganic material such as glass, and if an organic sheet is used it is best to use a primer, for example a silane, impregnated with quartz or other inorganic material. In this case a chain of bonds is formed from the organic sheet through the primer to the quartz and from the quartz to the polymer, so that the polymer forms a direct bond with the inorganic quartz while the bonding chain ensures that the polymer and the sheet are held together. An effective method of producing a laminate by the present invention is by placing two or more inclined sheets of frangible material in face-to-face relationship, temporarily sealing around all but one of the common edges of the sheets with gas-permeable tape so as to form an envelope, optionally prying apart the sheets along the remaining unsealed edge, pouring a liquid resin between the sheets into the included angle therebetween, expelling the resin towards the unsealed edge by application of pressure to the sheets or by laying the sheets flat, sealing the unsealed edge with gas-permeable tape and allowing the resin to set while maintaining the pressure to form a laminate.

When the sheets are held upright or at an angle to the horizontal during pouring of the liquid resin, glass tends to "balloon" outwards under the weight of the resin. If the sheets are vertical, a pair of vertical plates may be pressed against the sheets to counteract the "ballooning" and hold the sheets planar during curing of the resin, and this can be achieved in the case of angled sheets by placing weights on the "ballooned" position. Alternatively the sheets can be lowered to reduce their angle to the horizontal so that the weight of the upper sheet counteracts the "ballooning."

If desired, the polymer may be transparent.

There are several ways in which the method of the present invention can be put into practice, and examples of these will now be described by way of practical illustration.

EXAMPLE 1

A pair of clear rectangular glass sheets are cleaned, degreased and dried and placed in face-to-face relationship with a 3 mm thick gas-permeable tape "Scotchmount" between them around three sides to form a liquid seal. The sheets are then held at an angle of 10° to the vertical with the unsealed edges uppermost and a 4" strip of glass of the same width as the sheets and of the same thickness as the bottom sheet is affixed with adhesive tape to the top edge of the bottom sheet in the same plane as that sheet, as shown in FIG. 1 in which the sheets are 10 and 11, the gas-permeable tape is 12 and the strip is 13.

A measured amount of a mixture of UVAC 2721 resin, 1% of silane A172 and 1% of methyl ethyl ketone sufficient to fill the inter-sheet space is then poured onto the strip 13 so as to flow down into the space between the two sheets 10 and 11, and this causes a lower portion of the sheets 10 and 11 to "balloon" outwards under the weight of the resin.

When the resin has been poured into the space the top edges of the sheets 10 and 11 are sealed together with "Scotchmount" tape and weights are placed on the upper sheet 10, the lower sheet 11 being supported in order to counteract the "ballooning" of the sheets and to expel air through the gas-permeable tape. The strip 13 of glass can then be removed. The resin contains γ-methacryloxpropyltrimethoxysilane as a primer to achieve a good bond between the sheets.

The resin cures with minimum shrinkage to a clear thermoset sheet sandwiched between the glass sheets, so that a laminated glass is formed suitable for use in many situations as a safety glass.

As an alternative to placing weights on the upper sheet, the assembly can be lowered to form a greater angle to the vertical after expulsion of the air, whereby the weight of the upper sheet may be sufficient to counteract the "ballooning."

The 4" strip of glass is used to assist in pouring the resin between the sheets, but other methods can be used, for example a funnel or open channel extending into the inter-sheet space, or providing one of the sheets longer than the other so as to extend above it, the longer sheet forming the lower of the two when the resin is being poured; the excess glass can be trimmed to size after the resin has cured.

EXAMPLE 2

The method described in Example 1 is carried out with the exceptions that one of the glass sheets has a non-planar face, this face being the one adjacent the face of the other sheet, and the resin used is selected to have a refractive index similar to that of the glass.

Care is taken to ensure that the faces of the sheets are not in direct contact with one another, and the result is the production of a laminated glass which has an appearance similar to a laminate in which both glass sheets have planar surfaces, the effect of the resin being not only to bond the sheets together but also to complement the non-planar face thereby preventing distortion of light passing through the laminate.

EXAMPLE 3

Two rectangular sheets of glass are cleaned using a glass washing machine and gas-permeable "Scotchmount" tape is applied to all four edges of the perimeter of one of the sheets. The paper protecting the adhesive faces of the tape is removed from the bottom edge and both upright edges, and the second sheet of glass is laid in position on the first sheet so as to adhere to the tape. The two face-to-face sheets are then laid on an inclined tilting table, both sheets of glass are prised apart at their free edges and a funnel is inserted between them.

1% of silane A172 adhesion promoter is added to an amount of UVAC 2721 resin calculated as correct for filling the intersheet volume. 1% of methyl ethyl Ketone peroxide catalyst is then added to the resin/silane mixture with gentle but thorough mixing and the mixture is allowed to stand until all air bubbles have escaped. The mixture is then poured slowly between the sheets through the funnel.

When the mixture has settled in the lower part of the cavity the funnel is removed and a wedge inserted to keep the sheets apart. The protective paper is then removed from the tape at the top edge of the sheets and the table lowered until nearly horizontal; at the same time the space at the top is decreased. Pressure is then applied to the top edges of the glass until the liquid mixture has filled the entire intersheet volume and the table is made horizontal. The resin is then allowed to set and a laminate is obtained.

Faster curing of the resin can be achieved by increasing the amount of catalyst to a maximum of 3%, by raising the temperature, or by adding a small quantity of cobalt naphthenate (although care should be taken to prevent this substance from contacting the catalyst.)

In other embodiments of this invention the resin may be tinted with one or more colours, and/or other bodies may be included in the resin layer for example wire mesh, coloured or patterned cloth, flakes of metal or other material, or other decorative means, and in this way an attractive laminate may be produced easily and cheaply.

The method of the invention can also be used to form curved laminates of glass, polymethyl methacrylate, polycarbonate or other sheet material. An effective method of doing this is to hold face-to-face curved sheets apart at an angle to the vertical as with the flat sheets of Example 3 and to pour the liquid therebetween, the sheets being sealed at their peripheries by gas-permeable material.

In some instances the present method may be used to form laminates on existing sheets of frangible material in situ, for example by laminating existing glass doors or windows without removing them from their frames.

If desired, a glass laminate having additional properties similar to those of toughened glass can be produced by the method of the invention by using a liquid which shrinks to a certain extent on solidifying. An example of such a laminate can be made by the method of Example 1 with the exception that the UVAC 2721 resin is replaced by a resin which shrinks to a significant degree, the silane primer still being present. On curing, the resin bonds through the silane primer to the two glass sheets, at the same time undergoing shrinkage so that the effect is to put the surfaces of the glass sheets under tension; the resulting laminate is capable of withstanding greater impact than that of Example 1, and when it does break it forms fragments similar to those of tempered or toughened glass.

"Scotchmount" gas-permeable tape is of polyurethane material and a further example of a gas-permeable tape which is suitable for use in the method of this invention is "Inseal 5250" PVC tape manufactured by D.R.G. Inseal Products.

In the method of Example 3 it is sometimes of benefit, after the introduction of the resin mixture between the sheets, to tilt the table further than horizontal whereby the resin flows towards the originally unsealed edge of the sheets and forces air out under its weight. This is particularly useful when the resin mixture is viscous.

The present invention can be used in the manufacture of one-way mirrors in which case one of the sheets is coated on its inner face with a thin layer of silvering prior to the manufacture of the laminate. The laminate thus formed isolates the silvering from the atmosphere and prevents deterioration of the thin film. This overcomes the problem with conventional one-way mirrors in which the silvering is protected only by tape around the periphery of the sheets and no resin interlayer is present. Under these conditions the silvering gradually becomes oxidised and discoloured.

I claim:

1. A method of producing a laminate comprising placing a pair of sheets of frangible material in face-to-face relationship, introducing between the sheets a liquid which on solidifying forms a polymer of greater resistance to fracture than the sheets and adheres to the sheets, forming around the periphery of the sheets a continuous tape-like barrier to passage of the liquid thereby to retain the liquid between the sheets, wherein at least part of the barrier is gas-permeable, expelling air from the intersheet space through the barrier so as to cause the liquid to fill the intersheet space, and solidifying the liquid to form a bonded laminate.

2. A method according to claim 1, wherein the barrier is formed by adhesive tape for adhering to the sheets.

3. A method according to claim 1, wherein the entire barrier is gas-permeable.

4. A method according to claim 1, wherein the sheets are selected from glass, polymethyl methacrylate and polycarbonate.

5. A method according to claim 1, wherein the sheets and polymer are translucent.

6. A method according to claim 5, wherein the sheets and polymer have generally the same refractive index.

7. A method according to claim 1, wherein the polymer formed from the liquid is selected from polyesters, vinyl polymers and epoxy resins.

8. A method of producing a laminate comprising placing a pair of sheets of frangible material in spaced face-to-face relationship, sealing the sheets together around pair of their periphery to form an envelope, tilting the envelope so that the unsealed portion of the sheets is uppermost, introducing into the envelope through the unsealed portion a measured quantity of a liquid which on solidifying forms a polymer of greater resistance to fracture than the sheets and adheres to the sheets, sealing the unsealed portion to form around the periphery of the sheets a continuous tape-like barrier to passage of the liquid, at least an upper portion of the barrier being permeable to air, allowing air to escape from the envelope through the barrier so as to cause the liquid to fill the intersheet space and solidifying the liquid to form a bonded laminate.

9. A method according to claim 8, wherein the liquid is poured into the envelope under gravity.

10. A method according to claim 8, wherein the entire barrier is air-permeable.

* * * * *